(12) United States Patent
Münzenberger et al.

(10) Patent No.: US 9,995,037 B2
(45) Date of Patent: Jun. 12, 2018

(54) THROUGH-PENETRATION DEVICE, METHOD FOR MANUFACTURING A THROUGH-PENETRATION DEVICE, AND METHOD FOR INSTALLING A THROUGH-PENETRATION DEVICE

(71) Applicant: Hilti Aktiengesellschaft, Schaan (LI)

(72) Inventors: Herbert Münzenberger, Wiesbaden (DE); Manfred Klein, Kaufering (DE)

(73) Assignee: HILTI AKTIENGESELLSCHAFT, Schaan (LI)

( * ) Notice: Subject to any disclaimer, the term of this patent is extended or adjusted under 35 U.S.C. 154(b) by 108 days.

(21) Appl. No.: 14/992,402

(22) Filed: Jan. 11, 2016

(65) Prior Publication Data

US 2016/0123002 A1 May 5, 2016

Related U.S. Application Data

(63) Continuation of application No. PCT/EP2014/065343, filed on Jul. 17, 2014.

(30) Foreign Application Priority Data

Jul. 17, 2013 (EP) .................................... 13176837

(51) Int. Cl.
*E04B 1/94* (2006.01)
*H02G 3/22* (2006.01)
(Continued)

(52) U.S. Cl.
CPC .............. *E04B 1/941* (2013.01); *E04B 1/947* (2013.01); *E04B 1/948* (2013.01); *F16L 5/00* (2013.01);
(Continued)

(58) Field of Classification Search
CPC .... H02G 3/22; H02G 3/08; E04B 1/94; E04B 1/941; E04B 1/947; E04B 1/948;
(Continued)

(56) References Cited

U.S. PATENT DOCUMENTS 3,396,129 A 8/1968 Yeadon et al.
4,338,412 A 7/1982 von Bonin
(Continued)

FOREIGN PATENT DOCUMENTS

CA 2325183 5/2001
DE 3025309 2/1982
(Continued)

OTHER PUBLICATIONS

International Search Report for PCT/EP2014/065343, dated Oct. 13, 2014, 6 pages.

*Primary Examiner* — Beth A Stephan
(74) *Attorney, Agent, or Firm* — Grüneberg and Myers PLLC

(57) ABSTRACT

A through-penetration device has a molded body consisting essentially of an intumescent foam material and having at least one penetration opening for one line. An outer contour of the molded body has protrusions extending radially outward for anchoring within a cast building component, which protrusions form undercuts in building component as the building component is being cast. In addition, a mounting plate that can be axially pushed onto the through-penetration device, sealing the penetration openings, is provided. As the through-penetration device is produced, a liquid coating material is applied to a surface of a foaming mold, and then a foam mass containing a predetermined percentage of intumescent material is introduced into the
(Continued)

foaming mold. After a foaming process, the coating material forms a water-impermeable skin on the foamed molded body.

19 Claims, 2 Drawing Sheets

(51) Int. Cl.
  *F16L 5/00* (2006.01)
  *H01B 17/26* (2006.01)
  *F16L 5/04* (2006.01)
(52) U.S. Cl.
  CPC ............... *F16L 5/04* (2013.01); *H01B 17/26* (2013.01); *H02G 3/22* (2013.01)
(58) Field of Classification Search
  CPC ....... F16L 5/00; F16L 5/02; F16L 5/04; F16L 59/145; F16L 5/14; F16L 57/04; H01B 17/26
  USPC .......................................................... 52/232
  See application file for complete search history.

(56) References Cited

U.S. PATENT DOCUMENTS

| | | | | |
|---|---|---|---|---|
| 4,364,210 A | * | 12/1982 | Fleming | ............... E04B 1/947 174/151 |
| 4,367,295 A | | 1/1983 | von Bonin | |
| 4,380,593 A | | 4/1983 | von Bonin et al. | |
| 4,857,364 A | | 8/1989 | von Bonin | |
| 4,916,800 A | * | 4/1990 | Harbeke | ............... E04G 15/061 29/469 |
| 5,173,515 A | | 12/1992 | von Bonin et al. | |
| 5,390,465 A | * | 2/1995 | Rajecki | ............... A62C 2/065 285/211 |
| 5,452,551 A | * | 9/1995 | Charland | ............... A62C 2/065 52/1 |
| 5,934,333 A | | 8/1999 | Münzenberger et al. | |
| 6,305,133 B1 | * | 10/2001 | Cornwall | ............... F16L 5/04 52/1 |
| 7,521,495 B2 | | 4/2009 | Horacek et al. | |
| 9,528,636 B2 | * | 12/2016 | Beele | ............... F16L 5/10 |
| 2007/0289235 A1 | * | 12/2007 | Hansen | ............... A62C 3/16 52/309.7 |
| 2012/0216791 A1 | | 8/2012 | Münzenberger | |
| 2013/0068487 A1 | | 3/2013 | Klein et al. | |
| 2015/0204087 A1 | * | 7/2015 | Muenzenberger | ........ F16L 5/04 52/232 |
| 2016/0151947 A1 | * | 6/2016 | Muenzenberger | ...... B29C 44/02 277/633 |

FOREIGN PATENT DOCUMENTS

| | | |
|---|---|---|
| DE | 3041731 | 6/1982 |
| DE | 3302416 | 1/1983 |
| DE | 3411327 | 10/1985 |
| DE | 3917518 | 12/1990 |
| DE | 19653503 | 6/1998 |
| DE | 202012003405 | 7/2013 |
| EP | 0043952 | 1/1982 |
| EP | 0051106 | 5/1982 |
| EP | 0061024 | 9/1982 |
| EP | 0116846 | 8/1984 |
| EP | 0158165 | 10/1985 |
| EP | 0274068 | 7/1988 |
| EP | 1101992 | 5/2001 |
| EP | 1347549 | 9/2003 |
| EP | 1641895 | 4/2006 |
| EP | 2493041 | 8/2012 |
| EP | 2570157 | 3/2013 |
| WO | 8102814 | 10/1981 |
| WO | 03089828 | 10/2003 |
| WO | 2005003254 | 1/2005 |

* cited by examiner

THROUGH-PENETRATION DEVICE, METHOD FOR MANUFACTURING A THROUGH-PENETRATION DEVICE, AND METHOD FOR INSTALLING A THROUGH-PENETRATION DEVICE

RELATED APPLICATIONS

This application claims priority to, and is a continuation of, co-pending International Application No. PCT/EP2014/065343 having an International filing date of Jul. 17, 2014, which is incorporated herein by reference, and which claims priority to European Patent Application No. 13176837.6, having a filing date of Jul. 17, 2013, which is also incorporated herein by reference in its entirety.

BACKGROUND AND BRIEF SUMMARY OF THE INVENTION

The invention regards a through-penetration device, a process for manufacturing a through-penetration device, as well as a process for installing a through-penetration device. Through-penetration devices with intumescent material are used for the purpose of protecting cables and pipes routed through building components such as walls or ceilings, from fire. Such through-penetration devices can be installed retroactively into an opening in the building component. However, if the building component is cast from concrete, it is advantageous to cast-in the through-penetration devices at the same time; i.e., the liquid concrete will surround the through-penetration device.

It is the task of this invention to create a simply designed and cost-effectively producible through-penetration device that provides secure fire protection and that can be cast into a building component as a "cast-in" part.

For this purpose, a through-penetration device has, according to the invention, a molded body consisting essentially of an intumescent foam material and having at least one penetration opening for a line, whereby the outer contour of the molded body has protrusions extending radially outward for the purpose of anchoring in a cast building component. During casting, the protrusions on the outer contour will form undercuts in the concrete that serve to securely anchor the through-penetration device in the building component. The protrusions can easily be produced while the molded body is produced, in particular, by foaming in a mold.

The intumescent foam material preferably comprises a foamable binder containing an intumescent mix of substances. Here, the binder will act as an interlinking carrier for the intumescent mix of substances. Preferably, the mix of substances will be homogeneously distributed within the binder. The interlinking carrier is preferably selected from among the group consisting of polyurethanes, phenolic resins, polystyrenes, polyolefins—such as polyethylene and/or polybutylene, melamine resins, melamine resin foams, synthetic and natural rubber, cellulose, elastomers, and mixtures thereof, with polyurethanes being preferred.

The intumescent mix of substances comprises the fire protection additives that are common and known to the person skilled in the art, which additives will, in case of fire, i.e., when exposed to heat, start foaming and thus form a foam that hinders the propagation of flames, such as an intumescent material based on an acidifier, a compound producing carbon, and a gasifier. Preferably, the intumescent material will comprise an acidifier, a salt or an ester of an inorganic, nonvolatile acid selected from among sulfuric acid, phosphoric acid and boric acid; as a compound producing carbon, a poly-hydroxyl compound and/or a thermoplastic or duroplastic polymer resin binder; and as a gasifier, a chloro-paraffin, melamine, a melamine compound, in particular, melamine cyanurate, melamine phosphate, melamine polyphosphate, tri(hydroxyethyl)-cyanurate, cyanamide, dicyanamide, dicyandiamide, biguanidin and/or a guanidin salt, in particular, guanidin phosphate or guanidin sulfate.

In addition, the interlinking carrier can contain, as an ablative additive, an inorganic compound that contains water in solid form; e.g. as crystallization water, and will not dry out at temperatures of up to 100° C., but will release the water in case of fire at temperatures from 120° C. on, thus being able to cool components; this will preferably be an inorganic hydroxide or hydrate, in particular, aluminum hydroxide, aluminum oxide hydrates or partially hydrated aluminum hydroxides, that releases water when exposed to the fire's temperature or flames. But other inorganic hydroxides or hydrates releasing water when exposed to flames are also an option, such as those described in EP 0 274 068 A2.

Such compounds that can be used as mix of substances in the fire protection insert according to the invention, are known to the person skilled in the art and are, e.g., disclosed in the following citations, which are herewith expressly referenced: DE 30 25 309 A1, DE 30 41 731 A1, DE 33 02 416 A1, DE 34 11 327 A1, EP 0 043 952 B1, EP 0 051 106 B1, EP 0 061 024 B1, EP 0 116 846 B1, EP 0 158 165 B1, EP 0 274 068 A2, EP 1 347 549 A1, EP 1 641 895 B1, and DE 196 53 503 A1.

The production of the fire protection insert is possible, e.g., by foam molding, such as reaction injection molding (RIM) according to DE 3917518, e.g., with Fomox® fire protection foam or the HILTI CP 65GN building material that forms an insulation layer. Materials that can be used for purposes according to the invention are known from EP 0061024 A1, EP 0051106 A1, EP 0043952 A1, EP 0158165 A1, EP 0116846 A1, and U.S. Pat. No. 3,396,129 A, as well as EP 1347549 A1. Preferably, the molded body will consist of an intumescence-capable polyurethane foam, as it is known from EP 0061024 A1, DE 3025309 A1, DE 3041731 A1, DE 3302416 A, and DE 3411 327 A1.

However, in order to improve the stability of the foamed fire protection insert, glass fibers may also be integrated into the fire protection insert, which will result in considerably greater stability of the foamed material. For example, the fire protection insert may have a core made of glass fibers, in particular, a glass fiber weave. This will also improve the stability during work with the fire protection insert, allowing easier installation of the fire protection insert, in particular, easier folding or swiveling of the side elements.

The building component is, e.g., a wall or a ceiling made of concrete. The line may be, e.g., electrical cables, or pipes.

The molded body is, in its basic shape, embodied as a cuboid or a circular cylinder.

It is possible to integrate the molded body partially into a frame, or to mount it with a flange; e.g., in order to facilitate the casting inside the building component. But in doing so, the protrusions will always make contact with the material of the building component so that the molded body will be securely anchored within the building component.

Preferably, several protrusions will be provided that are arranged behind each other in the axial direction in order to improve the fastening in place of the molded body within the building component.

At least one of the protrusions may be embodied as circumferentially uninterrupted. But it is also possible to embody the protrusions around the circumference of the molded body with interruptions.

In an advantageous embodiment of the invention, the at least one penetration opening will initially be closed off by means of a membrane. The membrane may be embedded in the molded body, which is preferably already performed as the molded body is produced. It is advantageous if the membrane contains an intumescent material. When the lines are inserted, the membrane will be ruptured; it is, however, preferably embodied such that it will be contacting the lines. Thus, a smoke-proof closure can be created in case of fire, both in the penetration openings that are still closed, as well as in the penetration openings that are filled with lines.

The outer circumference of the molded body is preferably surrounded by a waterproof skin, thus preventing the intrusion of cement slurry and moisture from the concrete during the casting process. The waterproof skin may, e.g., be a film, but also a coating, preferably made of latex.

The protrusions may contain sufficient intumescent material for essentially closing off all of the penetration openings.

Here, a protrusion is considered that part of the molded body that extends radially into the building component into which the molded body is embedded.

The maximum diameter of the through-penetration device is defined by a cylindrical wall of the cast building component surrounding the molded body, which wall forms the interior wall of the opening in the building component, which opening is filled by the molded body. This dimension is identical to the dimension of a cylindrical outer wall of the molded body from which wall the protrusions extend, with the cross-section area corresponding to the cross-section area of the molded body, except for the protrusions.

The protrusions will preferably be embodied such that they contain sufficient intumescent material in order to be able to fill the maximum cross-section of the through-penetration device in case of a fire. It is also possible to remove all of the material of the molded body with the exception of the protrusions that remain in the building component, and to use all of the maximum cross-section of the through-penetration device for the lines.

For installing the through-penetration device in the building component, a through-penetration assembly is provided for, that has a through-penetration device as described above, as well as a mounting plate that can be axially pushed onto the through-penetration device, and which seals the penetration openings. The mounting plate will preferably be a fitted piece. It will preferably engage with any and all penetration openings of the molded body and seal these openings so tightly that concrete cannot get into the penetration openings.

The mounting plate can, e.g., be a molded part made of polystyrene or polypropylene particle foam. But it could also be a thermoformed part made of polypropylene or ABS. This will allow the mounting plate to be easily nailed to the formwork in order to secure the through-penetration device assembly in place before casting.

A through-penetration device as the one mentioned above can be produced by performing the following steps:
  applying a liquid coating material to a surface of a foaming mold, and
  subsequent introduction into the foaming mold of a foam mass containing a predetermined amount of intumescent material;
  whereby a water-impermeable skin will be formed by the coating material on the foam-molded body when the foaming process is completed.

In this manner, the water-impermeable skin can be produced directly during the production of the molded body together with the latter without requiring subsequent work steps.

Preferably, a latex material will be used as the coating material. In this case, the foam mass with its intumescent percentage will bond with the latex material, resulting in a foam-molded body that has a waterproof skin made of latex connected inseparably to its outer contour.

Foaming is preferably performed, as already mentioned above, by means of a reaction-injection molding process.

A through-penetration device such as the one described above is installed in a building component, in particular, in a wall or a ceiling made of concrete, in such a manner that during the casting of the building component, the molded body of the through-penetration device is cast-in in such a manner that the protrusions form undercuts within the building component. In this manner, it is solely by the outer contour of the molded body that secure fastening-in-place of the through-penetration device within the building component is achieved.

During the mounting process, in particular, a mounting plate of the through-penetration assembly described above will be fastened to the formwork, with the mounting plate having protrusions that match the penetration openings of the through-penetration device. The molded body of the through-penetration device will be placed on the protrusions of the mounting plate and fastened in place; e.g., by the penetration openings being wedged onto the protrusions of the mounting plate. The molded body will be cast into the building component, and the formwork and the mounting plate will be removed.

The mounting plate is preferably fastened securely to the formwork; e.g., by means of nailing, so that when the formwork is removed, the mounting plate will simultaneously be removed from the through-penetration device.

The molded part may be closed off at its end that is not pushed onto the mounting plate by means of a cover; e.g., a lid or film, in order to prevent moisture and concrete from entering.

BRIEF DESCRIPTION OF SEVERAL VIEWS OF THE DRAWINGS

Below, the invention will be described in more detail based on an exemplary embodiment, referencing the enclosed drawings. The drawings show the following.

DETAILED DESCRIPTION OF THE INVENTION

Figure 1:
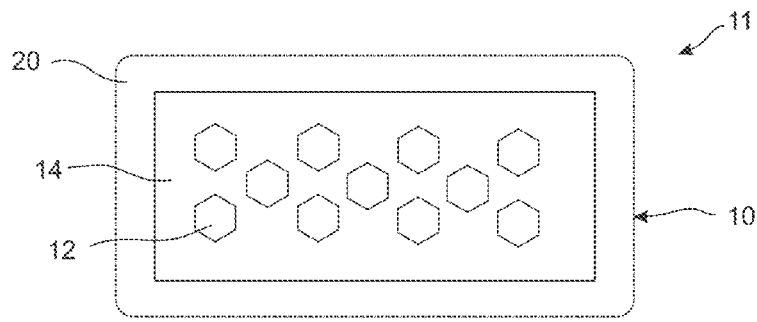
FIG. 1 a schematic top view of a face of a through-penetration device according to the invention.

For components occurring multiple times in any of the Figures, for clarity's sake, only a few have been marked with their reference numerals.

FIG. 1 shows a molded body 10 of a through-penetration device 11 according to the invention, which molded body essentially consists of an intumescent foam material. Molded body 10 has several penetration openings 12, herein having a hexagonal cross section, which openings extend from one face 14 of molded body 10 to the molded body's other, opposite face. In the embodiment shown here, penetration openings 12 are arranged in a honeycomb pattern.

Through-penetration device 11 is destined for routing lines such as cables or pipes through a cast-concrete building component 18 (see FIGS. 3 through 6).

The molded body 10 shown here has an essentially cuboid outer contour from which several protrusions 20 extend radially outward, which protrusions are circumferentially uninterrupted in this example. Protrusions 20 are embodied as one piece with the remaining molded body 10.

In the example shown, a total of four protrusions 20 are embodied on molded body 10, which protrusions are arranged in a circumferentially uninterrupted manner on molded body 10 and behind each other in the axial direction A of molded body 10.

Roughly in the axial middle of molded body 10, a membrane 22 made of, or made with an intumescent material has been molded-in, which membrane initially closes off any and all of the penetration openings 12.

The outer contour of molded body 10 is enclosed by a waterproof skin 24, which is not shown in any more detail.

In this example, skin 24 is produced simultaneously and together with molded body 10.

For producing through-penetration device 11, and in particular, molded body 10, a foaming mold (not pictured) will first be covered with a liquid latex mass on its interior surface. Then a foam mass, e.g., made of polyurethane, that contains a predetermined percentage of intumescent material, will be introduced into the foaming mold and foamed. The foam mass serves as a carrier for the intumescent material distributed within the foam mass. The intumescent material will not be activated by the foaming process; it will not swell until a fire occurs.

During the foaming process, the foam material will bond to the latex skin in such a manner that a permanent, inseparable connection between skin 24 and the cured foam is created. The finished molded body 10 can then be removed from the foaming mold.

In this work step, membrane 22 will also simultaneously be embedded into molded body 10, or molded onto it.

Figure 2:
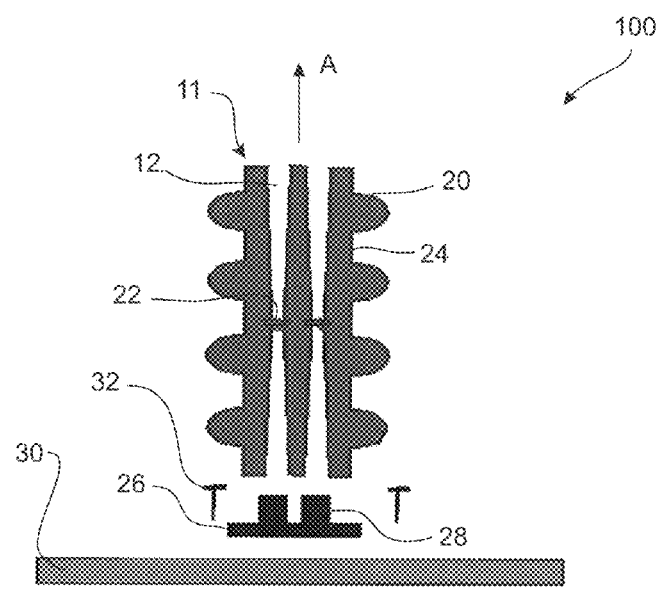
FIG. 2 a schematic view of a cross-section through a through-penetration assembly with a through-penetration device according to the invention.
Figure 3:
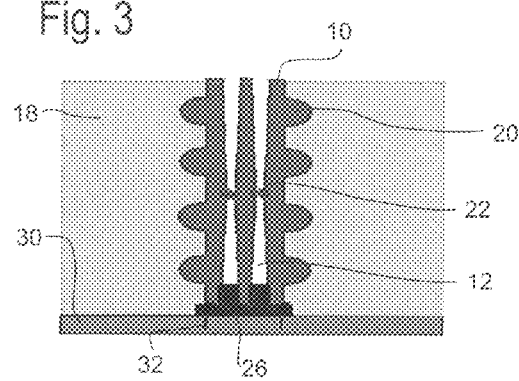
FIGS. 3 and 4 working steps for mounting a through-penetration device according to the invention in a building component.

FIG. 2 shows a through-penetration assembly 100 having, in addition to a through-penetration device 11, a mounting plate 26, which has a number of protrusions 28 that corresponds to the number of penetration openings 12, the cross-sections of which protrusions are shaped in such a manner that they will engage as tightly as possible with penetration openings 12.

Mounting plate 26 can, e.g., be a molded part made of polystyrene, polypropylene, or of another suitable material. It can also be a thermoformed part made of polypropylene or ABS.

For mounting through-penetration device 11 inside a building component 18 to be cast, such as a wall or ceiling made of concrete, mounting plate 26 is fastened to a formwork part 30; here, with nails 32.

Molded body 10 is pushed with its penetration openings 12 onto protrusions 28 of mounting plate 26.

It is possible to close off the (in FIG. 2) free upper end of molded body 10 with a lid or a film (not shown).

As building part 18 is cast, protrusions 20 of molded body 10 will be enclosed by concrete and will form undercuts in building component 18 (see FIG. 3), which undercuts will fasten molded body 10 in place within building component 18.

Figure 4:
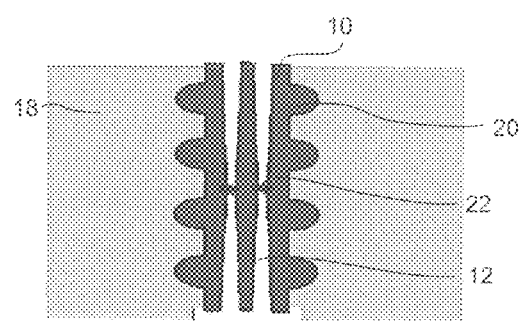

In the next step, formwork part 30 will be removed together with mounting plate 26 (see FIG. 4).

Figure 5:
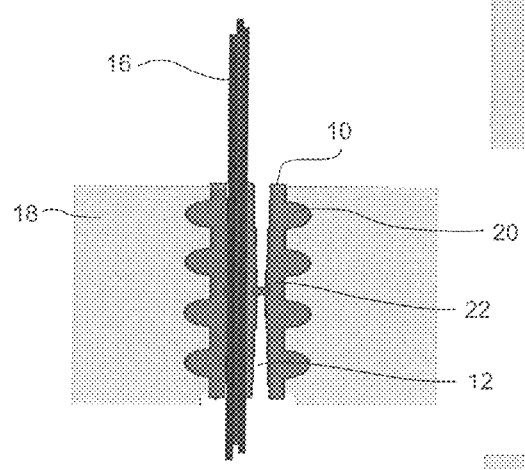
FIGS. 5 and 6 the inserting of lines into a through-penetration device according to the invention, which device is cast into a building component.

FIG. 5 shows the insertion of a single line 16 into one of the penetration openings 12. As line 16 is inserted, membrane 22 in this one penetration opening 12 will be penetrated. In the unused penetration openings 12, membrane 22 will remain intact.

Figure 6:
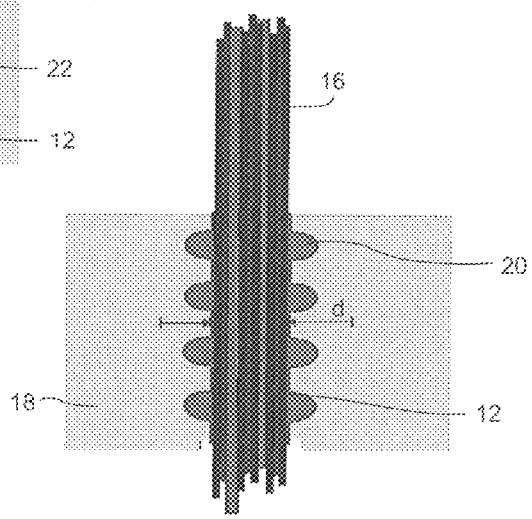

FIG. 6 shows the case in which a maximum plurality of lines 16 are to be routed through building component 18. In order to create the space required, molded body 10 is removed to such an extent that essentially only the protrusions 20 embedded in building component 18 remain. The maximum cross section of the through-penetration device; i.e., the entire cross-section of the opening in building part 18 (diameter d in FIG. 6) can now be filled with lines 16.

The total volume of all protrusions 20 and the quantity of the intumescent material within this volume has been selected in such a manner that, in the case of heat exposure, there will be sufficient intumescent material for filling the entire cross-section of the opening in building component 18.

If necessary, however, any cavities around cables must be sealed separately in order to achieve optimum smoke gas sealing.

What is claimed is:

1. A through-penetration device, comprising:
   a molded body consisting essentially of an intumescent foam material and having at least one penetration opening for a line,
   wherein an outer contour of the molded body comprises a plurality of protrusions extending radially outward,
   wherein the through-penetration device is configured for a cast building component,
   wherein each of the protrusions is configured for being anchored within the cast building component, and
   wherein an outer circumference of the molded body is surrounded by a waterproof skin.

2. The through-penetration device of claim 1, wherein the protrusions of the plurality of protrusions are arranged behind each other in an axial direction.

3. The through-penetration device of claim 1, wherein each of the protrusions of the plurality of protrusions is circumferentially uninterrupted.

4. The through-penetration device of claim 1, wherein the at least one penetration opening is closed off by a membrane.

5. The through-penetration device of claim 1, wherein the plurality of protrusions contains sufficient intumescent material to fill, in response to a fire, a cavity with a cross-sectional area corresponding to a cross-sectional area of the molded body excluding the plurality of protrusions.

6. The through-penetration device of claim 1, further comprising a mounting plate coupled to the molded body and configured to seal the at least one penetration opening.

7. A method for producing the through-penetration device of claim 1, the method comprising:
   applying a liquid coating material to a surface of a foaming mold; and
   after said applying, introducing a foam mass into the foaming mold, wherein the foam mass contains a predetermined percentage of intumescent material; and
   subjecting the foam mass to a foaming process to obtain the molded body, which is a foamed molded body having a water-impermeable skin formed from the liquid coating material.

8. The method of claim 7, further comprising casting a building component around the foamed molded body such that the plurality of protrusions extending radially outward from the foamed molded body anchor the foamed molded body in the building component.

9. The method of claim 8, further comprising:
mounting a mounting plate on a formwork part, wherein the mounting plate comprises a plurality of protrusions matching a plurality of through-penetration openings of the foamed molded body;
setting the plurality of through-penetration openings of the foamed molded body onto the plurality protrusions of the mounting plate; and
removing the formwork part and the mounting plate after said casting the building component around the foamed molded body.

10. A through-penetration device, comprising:
a molded body consisting essentially of an intumescent foam material and having at least one penetration opening for a line,
wherein an outer contour of the molded body comprises a plurality of protrusions extending radially outward,
wherein the through-penetration device is configured for a cast building component,
wherein each of the protrusions is configured for being anchored within the cast building component, and
wherein the plurality of protrusions contains sufficient intumescent material to seal the at least one penetration opening in response to a fire.

11. The through-penetration device of claim 10, wherein the protrusions of the plurality of protrusions are arranged behind each other in an axial direction.

12. The through-penetration device of claim 10, wherein each of the plurality of protrusions is circumferentially uninterrupted.

13. The through-penetration device of claim 10, wherein the at least one penetration opening is closed off by a membrane.

14. The through-penetration device of claim 10, wherein the plurality of protrusions contains sufficient intumescent material to fill, in response to a fire, a cavity with a cross-sectional area corresponding to a cross-sectional area of the molded body excluding the plurality of protrusions.

15. The through-penetration device of claim 10, further comprising a mounting plate coupled to the molded body and configured to seal the at least one penetration opening.

16. The through-penetration device of claim 10, wherein an outer circumference of the molded body is surrounded by a waterproof skin.

17. A method for producing the through-penetration device of claim 10, the method comprising:
applying a liquid coating material to a surface of a foaming mold; and
after said applying, introducing a foam mass into the foaming mold, wherein the foam mass contains a predetermined percentage of intumescent material; and
subjecting the foam mass to a foaming process to obtain the molded body, which is a foamed molded body having a water-impermeable skin formed from the liquid coating material.

18. The method of claim 17, further comprising casting a building component around the foamed molded body such that the plurality of protrusions extending radially outward from the foamed molded body anchor the foamed molded body in the building component.

19. The method of claim 18, further comprising:
mounting a mounting plate on a formwork part, wherein the mounting plate comprises a plurality of protrusions matching a plurality of through-penetration openings of the foamed molded body;
setting the plurality of through-penetration openings of the foamed molded body onto the plurality protrusions of the mounting plate; and
removing the formwork part and the mounting plate after said casting the building component around the foamed molded body.

* * * * *